Patented Sept. 22, 1942

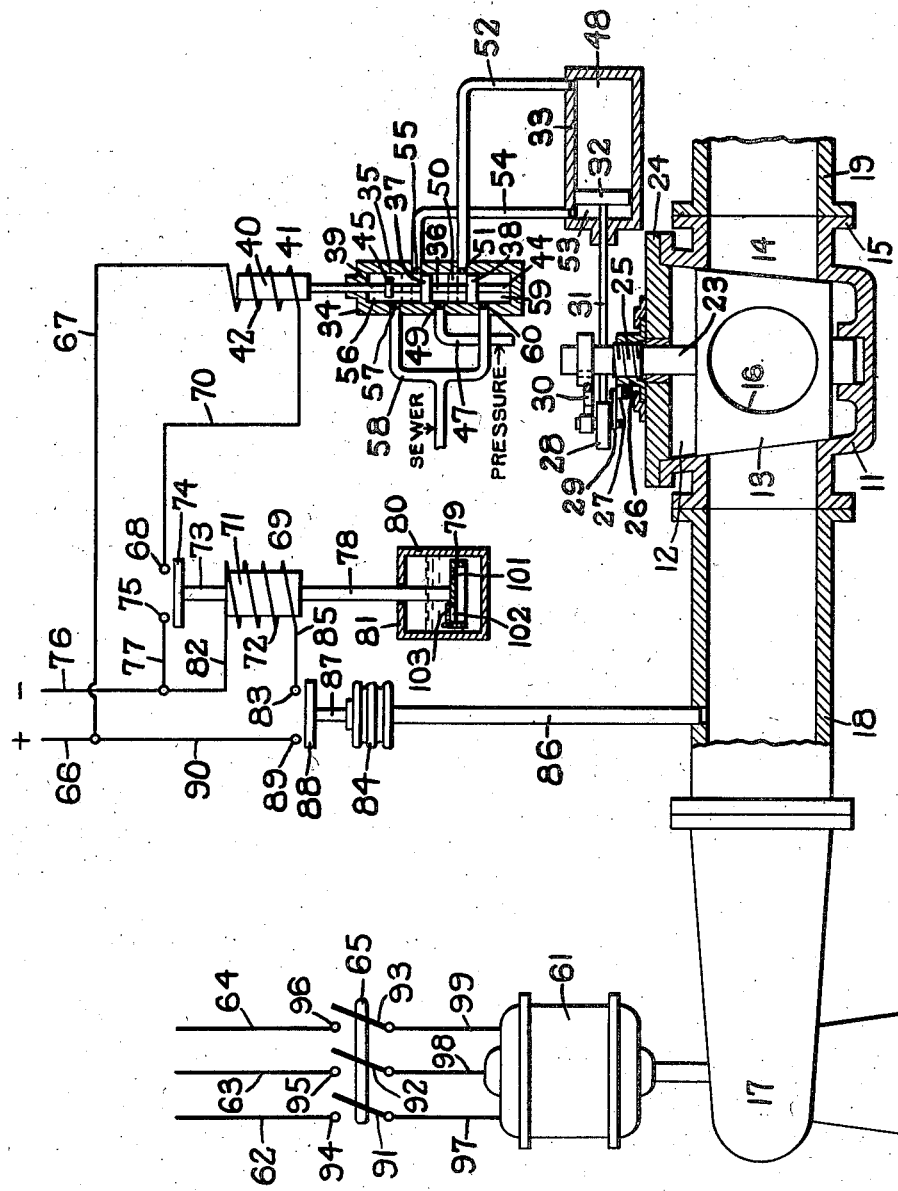

2,296,568

UNITED STATES PATENT OFFICE 2,296,568

CONTROL SYSTEM

Frank E. Peacock, York, Pa., assignor to S. Morgan Smith Company, York, Pa., a corporation of Pennsylvania Application January 26, 1940, Serial No. 315,778

5 Claims. (Cl. 137—78)

This invention relates to control systems, and more particularly to control systems adapted to control the operation of power operated tapered plug valves.

An object of the invention is to provide an improved control system for power operated mechanism of a valve installed in a pipe line, in which electrically operated means controlled by variations in the pressure of the fluid in the pipe line, are associated with the valve mechanism in such a manner that sudden changes in the pressure of the fluid in the pipe line occurring during the closing movement of the valve will be ineffective in causing reversals in the operation of the valve control mehanism.

Another object of the invention is to provide an improved control system for power operated mechanism of a valve installed in a pipe line on the pressure side of a motor driven pump, in which electromagnetically operated means are controlled by a time delay switch device which is operated by electromagnetically operated means controlled by a pressure switch device operated by variations in the pressure of the fluid in the pipe line between the pump and the valve, the time delay switch device being so constructed as to operate at a slower rate of speed from its open to its closed position than vice versa, so that sudden changes in the pressure of the fluid in the pipe line will be ineffective in causing operation of the valve control mechanism.

In the accompanying drawing, the single figure is a diagrammatic view, partly in section, of a control system embodying the present invention, the valve and its associated mechanism being shown in valve closed position.

Referring to the drawing, the improved control mechanism may be used in connection with a tapered plug valve of the type embodying a main body or casing 11, having a cavity 12 formed therein for a tapered plug 13, the cavity 12 being intersected by a waterway or opening 14 which constitutes a passage through the valve.

The plug 13 has a passage 16 formed therein, so that when the plug 13 is in open position a bore will extend through the valve from end to end.

The portion of the valve casing 11 in which the waterway 14 is formed may terminate in flanges 15 by which the valve may be connected to the ends of pipes or conduits in well known manner.

In the present instance one end of the valve 11 is shown connected to the discharge end of a pump 17 by a pipe 18, and the other end of the valve is connected to a pipe 19.

The pump 17 is adapted to deliver water from a suitable source of supply to the pipe, and the valve 11 may be adapted to control communication through the pipe line from the pump, so that when the pump is inactive, communication through the pipe line is cut off by the valve, thereby preventing back flow of water towards the pump.

The valve plug 13 is supported for both axial and rotary movement in the valve body 11, and at its upper or larger end, the plug 13 has fixed thereto a shaft 23 which extends through a cover plate 24 attached to the valve body 11.

The valve shaft 23 is formed with screw threads 25 on which is mounted a lift nut 26, having a lateral extension 27 connected to a reciprocable member 28, by a link 29.

Also connected to the member 28 is the end of a crank arm or rotating lever 30, which arm is keyed or otherwise made rigid with the valve shaft 23.

When the member 28 is moved rectilinearly in the manner to be hereinafter described, the nut 26 is turned with respect to the shaft 23, thereby effecting axial movement of the valve plug 13, so as to unwedge said plug. Continued movement of the member 28, after the plug 13 has been unwedged, effects operation of the lever 30, whereby said plug is rotated towards open position. At the completion of the rotary movement of the plug 13, through the operation of the lever 30, the nut 26 is again turned on the shaft 23, but in a reverse direction, so as to move the plug 13 axially and wedge the same in the valve body 11.

The member 28 is connected to a rod 31 of a piston 32 mounted in a cylinder 33.

For the purpose of controlling the operation of the piston 32, a suitable control valve device 34 is employed.

The control valve 34 comprises a casing formed with a cylindrical bore 35, in which is mounted a piston valve 36 having a pair of spaced heads 37 and 38.

The piston valve 36 has a stem 39 which extends through the casing of the control valve 34 and is connected to the solenoid core 40 of an electromagnetic device 41.

When the valve plug 13 is in closed position as shown in the drawing, the coil 42 of the solenoid 40 will be deenergized, and as the result thereof the piston valve 36 will be so positioned that fluid under pressure will be supplied from the pressure supply pipe 47 to piston chamber 48, through port 49, valve chamber 50, port 51, and pipe 52, and piston chamber 53 will be connected to a sewer or free discharge, through pipe 54, port 55, valve chamber 56, port 57, and pipe 58.

The piston valve 36 has a stem 44 on the lower end thereof which is adapted to limit the downward movement of the piston valve 36 in the bore 35 under forces exerted on said piston valve by the weight of the solenoid core 40 when the coil 42 is deenergized.

When the electromagnetic device 41 is energized, the solenoid core 40 is moved upward rectilinearly, thereby shifting the piston valve 36 to the dotted line position illustrated, in which position of the piston valve, piston chamber 48 is connected to the sewer or free discharge pipe 58, through port 51, valve chamber 59, and port 60. At the same time, piston chamber 53 is connected to the pressure supply pipe 47, through pipe 54, port 55, valve chamber 50, and port 49. The piston 32 is then actuated to operate the valve plug mechanism and effect movement of the plug 13 from closed to open position. The valve plug 13 will remain in open position as long as the electromagnetic device 41 is energized.

Upward movement of the piston valve 36 within the bore 35 is limited by means of a collar 45 mounted on the stem 39 and engageable with the upper end wall of said bore when the piston valve 36 is moved upwardly to the dotted line position shown in the drawing.

The pump 17 may be operated by an electric motor 61 of any suitable type, said motor being adapted to be supplied with electric current from a suitable source of power supply, such as the power lines 62, 63 and 64, under the control of a switch device 65.

One end of the coil 42 is connected to a positive line 66 from a suitable source of electrical energy, by a conductor 67, and the other end of said coil is connected to a contact point 68 of a time delay switch device 69, by a conductor 70.

The time delay switch device 69 comprises a solenoid core 71 adapted to be energized by a coil 72.

The solenoid core 71 has an operating shaft 73 which carries a contact bar 74. The contact bar 74 is adapted to connect the contact points 68 and 75 when the coil 72 is energized, the contact point 75 being connected with the negative line 76, by a conductor 77.

Also connected to the solenoid core 71 of the time delay switch device 69 is a rod 78.

Mounted on the end of the rod 78 is a piston 79 which is disposed within the cylinder 80 of a dash pot device 81, said cylinder containing a suitable amount of fluid for controlling the movement of said piston therein in well known manner.

Preferably the dash pot device 81 should be of the type known as a differential dash pot. In such type of dash pot device, the piston 79 may be formed with a relatively small opening 101 through which the fluid in the cylinder 80 passes from one side of the piston to the other side thereof, when the piston is moved upwardly and downwardly in the cylinder. Also formed in the piston 79 is a relatively large opening 102. Normally closing the opening 102 is a check or flap valve 103.

The construction of the piston 79 and the valve 103 is such that when the piston 79 is moved upwardly the valve 103 is retained in position to cut off communication through the opening 102, and since the fluid can only pass through the small opening 101, the upward movement of the piston 79 is somewhat retarded. On the other hand, when the piston 79 is moved downwardly from its uppermost position, the valve 103 is moved to a position in which communication is established through the opening 102, and since said opening is somewhat larger as compared to the area of the opening 101, the fluid flows readily through the piston opening 102, so that the resistance of the fluid on the piston is not as great as is the resistance thereon during the upward movement of said piston, and consequently the piston travels downwardly at a rate considerably faster than the rate of upward travel thereof. The purpose of utilizing a dash pot device of this type will be hereinafter more fully described.

One end of the coil 72 is connected to the negative line 76, by a conductor 82, and the other end of said coil is connected to a contact point 83 of a pressure switch device 84, by a conductor 85.

The pressure switch device 84 has an expansible chamber connected to the pipe 18 by a pipe 86, so that said chamber is subjected to the pressure of the fluid in the pipe 18, in order to actuate a shaft 87 which carries a contact bar 88, to connect the contact points 83 and 89 when the pressure of fluid in the pipe is built up to a predetermined amount in the manner to be hereinafter described.

The contact point 89 is connected to the positive line 66, by a conductor 90.

When the pump 17 is inactive, the valve plug 13 is in closed position as shown. Since there is no pressure of fluid in the pipe 18 when the pump is inactive, the contact bar 88 of the pressure switch 84 will be disconnected from the contact points 83 and 89, and consequently the coil 72 is deenergized, with the result that the contact bar 74 of the time delay switch 69 will be disconnected from the contact points 68 and 75, so that the coil 42 of the electromagnetic device 41 is deenergized.

When it is desired to start the pump 17, the contact bars 91, 92 and 93 of the switch 65 are moved into engagement with the contact points 94, 95 and 96 to which the ends of the lines 62, 63 and 64 are, respectively, connected. In this way electric current will be supplied to the motor 61 through the conductors 97, 98 and 99 which lead from the switch 65 and are connected to terminals of the motor 61.

When the pump 17 is thus initially started, the valve plug 13 will remain closed until the pressure of fluid in the pipe 18 has increased a predetermined amount in order to permit the pump motor 61 to attain its normal operating speed.

After the pump has thus been operated for a predetermined length of time, fluid pressure in the pipe 18 is built up sufficiently to actuate the pressure switch 84 so that the contact bar 88 connects the contact points 83 and 89 to close the electric circuit from the positive line 66 through conductor 90, contacts 89, 88 and 83, conductor 85, coil 72, and conductor 82, to the negative line 76, thereby energizing the solenoid coil 72.

When the coil 72 is thus energized the contact bar 74 will be moved into engagement with the contact points 68 and 75, to close the electric circuit from the positive line 66 through conductor 67, solenoid coil 42, conductor 70, contacts 68, 74 and 75, and conductor 77, to the negative line 76, thereby energizing the solenoid coil 42.

When the coil 42 of the electromagnetic valve device 41 is energized the core 40 will be actuated to thereby operate the pilot valve 34, with the result that the valve plug 13 is operated by piston 32 and associated mechanism and rotated to open position.

In this way communication through the pipe line leading from the pump 17 will be established, and this communication will remain open until it is desired to shut down the apparatus.

When it is desired to shut down the pump 17, the switch 65 is operated to disconnect the contact arms 91, 92 and 93 from the contact points 94, 95 and 96, respectively, thereby opening the circuit through which electrical energy is supplied to the motor 61. Consequently the motor ceases to operate the pump.

Cessation of pump operation causes immediate drop in pressure in the pipe line due to water hammer phenomena. Consequently, the pressure of the fluid acting on the pressure switch device 84 and by which the contact bar 88 is held in engagement with the contact points 83 and 89 drops, so that the pressure switch device is actuated and opens the secondary circuit through which current is supplied to energize the solenoid coil 72.

When the coil 72 is thus deenergized the time delay switch device 69 is operated and due to the construction of the dash pot device 81, as has been heretofore described, the contact bar 74 is immediately disengaged from the contact points 68 and 75, so that the circuit through which current is supplied to energize solenoid coil 42 is opened, thereby deenergizing the coil 42.

When the coil 42 is thus deenergized the core 40 returns to the position shown in the drawing, so that the valve plug 13 is operated by the piston 32 and associated mechanism and returned to closed position.

During the closing operation of the valve just described, the reflected wave of fluid in the pipe line causes immediate pressure rise in the pressure switch device 84, with the result that the contact bar 88 is moved into engagement with the contact points 83 and 89. This results in current again being supplied to the solenoid coil 72 through the secondary circuit, and consequently the core 71 is actuated to close the time delay switch device 69. However, due to the provision of the dash pot device 81, the upward movement of the contact bar 74 is retarded to such an extent that before said contact bar engages the contact points 68 and 75, the pressure of fluid acting on the pressure switch device again drops.

It will thus be noted that, although the pressure switch device 84 is sensitive to variations in the pressure of the fluid in the pipe line, and as the result of this sensitivity it will operate to close the circuit through which the solenoid coil 72 is energized, the operation of the time delay switch device 69 is retarded to such an extent by the dash pot device 81, that the circuit through which the electromagnetic device 41 is energized will not be closed by reflected waves in the pressure of the fluid in the pipe line resulting from shutting down of the pump motor or from other causes. Therefore, by providing the above described control system I have provided means by which the operating mechanism of the valve plug 13 is so controlled that, when the closing operation of said plug is once initiated, sudden increases of pressure in the pipe line will not be effective to cause a reversal of operation of the valve operating mechanism.

Having thus described my invention, what I claim is:

1. A control system for a pipe line having a valve for controlling communication through said pipe and in which reflected waves are produced in the fluid under pressure during the closing operation of said valve which cause sudden increases in the pipe line pressure comprising, mechanism for actuating the valve, fluid pressure operated means movable in one direction for actuating said mechanism to open the valve, said fluid pressure operated means being movable in the opposite direction to operate said mechanism to close the valve, a control valve for controlling the operation of said fluid pressure operated means, said control valve being arranged in one position to effect operation of the fluid pressure operated means in one direction and in another position to effect operation of the fluid pressure operated means in the opposite direction, an electromagnetic device to operate said control valve, said electromagnetic device being adapted when energized to effect movement of said control valve to a position corresponding to the open position of said pipe line valve, a switch device to control the energization of said electromagnetic device from a source of current supply, electromagnetic means for operating said switch device to closed position when energized, means for controlling the operation of said electromagnetic means and including a switch device operated by means responsive to variations of fluid pressure in the pipe on the upstream side of said pipe line valve and operable when the pipe line pressure exceeds a predetermined value for closing the electric circuit by which said electromagnetic means is energized, and means operatively connected to said electromagnetic means for retarding the operation of said electromagnetic means in its circuit closing direction so that the circuit by which the electromagnetic device is energized will not be closed by the reflected waves in the pressure of the fluid in the pipe line.

2. A control system for a pipe line having a valve for controlling communication through said pipe and in which reflected waves are produced in the fluid under pressure during the closing operation of said valve which cause sudden increases in the pipe line pressure comprising, mechanism for operating the valve, fluid pressure operated means movable in one direction for actuating said mechanism to open the valve and movable in the opposite direction to operate said mechanism to close the valve, a control valve for controlling the operation of said fluid pressure operated means, said control valve being arranged in one position to effect operation of the fluid pressure operated means in one direction and in another position to effect operation of the fluid pressure operated means in the opposite direction, an electromagnetic device to control the operation of said control valve, said electromagnetic device being adapted when energized to effect movement of said control valve to a position corresponding to the open position of said pipe line valve, a switch device to control the energization of said electromagnetic device from a source of current supply, a time delay electrically operated mechanism to operate said switch device to closed position when energized, said time delay mechanism having means to retard the operation of the switch device in its circuit closing direction so that the circuit by which the electromagnetic device is energized will not be closed by the reflected waves in the pressure of the fluid in the pipe line when the closing operation of said valve is once initiated, and a pressure switch device responsive to variations of fluid pressure in the pipe on the upstream side of the valve, said pressure switch device being operable when the pipe line pressure exceeds a predetermined amount for closing the electric circuit by which the time delay electrically operated mechanism is energized.

3. A control system for a pipe line having a valve for controlling communication through said pipe and in which reflected waves are produced in the fluid under pressure during the closing operation of said valve which cause sudden increases in the pipe line pressure comprising, mechanism for actuating the valve, fluid pressure operated means movable in one direction for actuating said mechanism to open the valve and movable in the opposite direction to operate said mechanism to close the valve, a control valve for controlling the operation of said fluid pressure operated means, said control valve being arranged in one position to effect operation of the fluid pressure operated means in one direction and in another position to effect operation of the fluid pressure operated means in the opposite direction, an electromagnetic device to control the operation of said control valve, said electromagnetic device being adapted when energized to effect movement of said control valve to a position corresponding to the open position of said pipe line valve, a switch device to control the energization of said electromagnetic device from a source of current supply, a time delay electrically operated mechanism to operate said switch device to closed position when energized, said time delay mechanism having means to control the speed of operation of said switch device whereby the movement of the switch device from open to closed position is retarded with respect to the movement of said switch device from closed to open position so that said switch device will not be closed by sudden increases in the pressure of the fluid in the pipe when the closing operation of the pipe line valve is initiated, a secondary circuit from the source of current supply for energizing said time delay electrically operated mechanism, and a pressure switch device responsive to variations of fluid pressure in the pipe line to control the operation of said time delay mechanism, said pressure switch device being adapted to close the secondary circuit through which current is supplied to said time delay electrically operated mechanism when the pipe line pressure exceeds a predetermined amount.

4. A control system for a pipe line having a valve for controlling communication through said pipe and in which reflected waves are produced during the closing operation of said valve comprising, mechanism for operating the valve and including a fluid pressure operated piston, a pilot valve for controlling the operating fluid to said piston, an electromagnetic device having a coil and a core to operate said pilot valve to effect an opening movement of said valve mechanism when said coil is energized, a switch device to control the energization of said electromagnetic device from a source of current supply, electrically operated means for actuating said switch device to closed position when energized, a secondary circuit from the source of current supply for energizing said electrically operated means, a pressure switch device sensitive to variations in the pressure of fluid in the pipe and adapted to close the circuit through which current is supplied by said secondary circuit when the pipe line pressure exceeds a predetermined amount, and means operatively connected with said electrically operated means for retarding the operation thereof in its circuit closing direction to such an extent that the circuit through which the electromagnetic device is energized will not be closed by the reflected waves of fluid pressure in the pipe, so that when the closing operation of said valve is initiated, sudden increases of pressure in the pipe will not be effective to cause reversal of operation of the valve operating mechanism.

5. A control system for a pipe line having a valve for controlling communication through said pipe and in which reflected waves are produced in the fluid pressure during the closing operation of said valve which cause sudden increases in the pipe line pressure comprising, mechanism for actuating said valve and including a fluid pressure operated piston, a pilot valve for controlling the operating fluid to said piston, said pilot valve being arranged in one position to effect operation of the piston in one direction and in another position to effect operation of said piston in the opposite direction, an electromagnetic device to control the operation of said pilot valve to effect a valve opening movement of said piston when said electromagnetic device is energized, a switch device to control the energization of said electromagnetic device from a source of current supply, electromagnetic means for operating said switch device to closed position when energized, a secondary circuit from the source of current supply for energizing said electromagnetic means, a second switch device adapted to close the circuit through which current is supplied by said secondary circuit to energize said electromagnetic means, means responsive to variations of pressure of the fluid in the pipe and operable when the pipe line pressure exceeds a predetermined amount for actuating said second switch device to close said secondary circuit, and means associated with said first named switch device to control the operation thereof whereby the movement of said first named switch device from open to closed position is retarded with respect to the movement of said first named switch device from closed to open position, so that when the closing operation of said pipe line valve is initiated, sudden increases of pressure in the pipe will not be effective to cause reversal of operation of said valve operating mechanism.

FRANK E. PEACOCK.